(12) United States Patent
Meyer et al.

(10) Patent No.: US 11,351,764 B2
(45) Date of Patent: Jun. 7, 2022

(54) OPAQUE MULTI-LAYER BODY OF POLYCARBONATE FOR HEAT MANAGEMENT

(71) Applicant: Covestro Deutschland AG, Leverkusen (DE)

(72) Inventors: Alexander Meyer, Düsseldorf (DE); Rafael Oser, Krefeld (DE); Dirk Hinzmann, Pulheim (DE); Timo Kuhlmann, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 281 days.

(21) Appl. No.: 16/461,431

(22) PCT Filed: Nov. 16, 2017

(86) PCT No.: PCT/EP2017/079374
§ 371 (c)(1),
(2) Date: May 16, 2019

(87) PCT Pub. No.: WO2018/091558
PCT Pub. Date: May 24, 2018

(65) Prior Publication Data
US 2019/0344538 A1     Nov. 14, 2019

(30) Foreign Application Priority Data

Nov. 17, 2016   (EP) .................................... 16199350

(51) Int. Cl.
    *B32B 27/36*     (2006.01)
    *B32B 15/09*     (2006.01)
    (Continued)

(52) U.S. Cl.
    CPC .............. *B32B 27/365* (2013.01); *B32B 7/12* (2013.01); *B32B 15/09* (2013.01); *B32B 27/308* (2013.01);
    (Continued)

(58) Field of Classification Search
    CPC ................ B32B 27/365; B32B 27/308; B32B 2255/205; B32B 2307/41; B32B 27/08
    See application file for complete search history.

(56) References Cited

U.S. PATENT DOCUMENTS 3,061,467 A * 10/1962 Vincent .................. C08G 77/20
    427/387
4,101,513 A     7/1978 Fox et al.
(Continued)

FOREIGN PATENT DOCUMENTS

CN     105008446 A     10/2015
CN     105818663 A     8/2016
(Continued)

OTHER PUBLICATIONS

International Search Report for PCT/EP2017/079374 dated Jan. 3, 2018.
(Continued)

*Primary Examiner* — Monique R Jackson
(74) *Attorney, Agent, or Firm* — Faegre Drinker Biddle & Reath LLP (57) ABSTRACT

The invention relates to a vehicle body part, comprising a multi-layer body, comprising, in this order, a) optionally a protective layer a, b) a substrate layer b based on a thermoplastic polymer, having a light transmittance of less than 1.0% in the range of 380 to 780 nm, determined at a layer thickness of 4 mm in accordance with DIN ISO 13468-2: 2006 (D65, 10°), and an energy transmittance TDS of less than 40%, determined in accordance with ISO 13837:2008
(Continued)

at a layer thickness of 4 mm, c) optionally a further layer c based on a thermoplastic polymer having a maximum thickness of 600 µm, d) a metal layer d, containing at least one element selected from Ag, Al, Au, Pt, Fe, Cr, Sn, In, Ti, Pd, Nb, Cu, V, stainless steel or alloys thereof, having a thickness of 40 nm to 500 µm, and e) optionally a protective layer e, wherein the metal layer d is arranged on the side of the multi-layer body that is intended to be oriented toward the vehicle interior and wherein the layers following the layer d), including the protective layer e, have a total thickness of at most 50 nm.

12 Claims, 1 Drawing Sheet

(51) Int. Cl.
  *B32B 27/30* (2006.01)
  *B32B 27/08* (2006.01)
  *B32B 7/12* (2006.01)
  *B32B 15/18* (2006.01)
  *B32B 15/20* (2006.01)

(52) U.S. Cl.
  CPC ............ *B32B 15/18* (2013.01); *B32B 15/20* (2013.01); *B32B 27/08* (2013.01); *B32B 2255/10* (2013.01); *B32B 2255/205* (2013.01); *B32B 2255/24* (2013.01); *B32B 2255/28* (2013.01); *B32B 2264/108* (2013.01); *B32B 2307/41* (2013.01); *B32B 2605/00* (2013.01)

(56) References Cited

U.S. PATENT DOCUMENTS

| | | | |
|---|---|---|---|
| 4,185,009 A | 1/1980 | Idel et al. | |
| 4,395,463 A | 7/1983 | Kray | |
| 5,041,313 A | 8/1991 | Patel | |
| 5,235,026 A | 8/1993 | Wulff et al. | |
| 5,288,778 A | 2/1994 | Schmitter et al. | |
| 5,367,044 A | 11/1994 | Rosenquist | |
| 5,391,795 A | 2/1995 | Pickett | |
| 5,821,380 A | 10/1998 | Holderbaum et al. | |
| 5,869,185 A | 2/1999 | Bahr et al. | |
| 5,883,165 A | 3/1999 | Kröhnke et al. | |
| 6,228,973 B1 | 5/2001 | McCloskey et al. | |
| 6,350,512 B1 | 2/2002 | Hurley et al. | |
| 6,355,723 B1* | 3/2002 | van Baal | F21S 41/37 524/602 |
| 6,586,556 B2 | 7/2003 | Kratschmer et al. | |
| 6,613,869 B1 | 9/2003 | Horn et al. | |
| 7,425,358 B2 | 9/2008 | Heuer et al. | |
| 7,442,430 B2 | 10/2008 | Buckel et al. | |
| 7,547,755 B2 | 6/2009 | Heuer | |
| 8,378,021 B2 | 2/2013 | Schultes et al. | |
| 8,968,610 B2 | 3/2015 | Meyer et al. | |
| 9,845,412 B2 | 12/2017 | Meyer et al. | |
| 2002/0037414 A1 | 3/2002 | Cunningham | |
| 2002/0114924 A1* | 8/2002 | Albert | B44C 1/10 428/141 |
| 2003/0076582 A1 | 4/2003 | Phillips et al. | |
| 2012/0100326 A1 | 4/2012 | Sherman et al. | |
| 2013/0011662 A1 | 1/2013 | Clamer et al. | |
| 2015/0146286 A1* | 5/2015 | Hagen | C03C 17/3435 359/359 |
| 2015/0185382 A1 | 7/2015 | Leyder et al. | |
| 2015/0353712 A1 | 12/2015 | Meyer et al. | |
| 2016/0218335 A1 | 7/2016 | Baek | |
| 2019/0218353 A1* | 7/2019 | Ozawa | B32B 21/08 |

FOREIGN PATENT DOCUMENTS

| | | |
|---|---|---|
| DE | 1031512 B | 6/1958 |
| DE | 2500092 A1 | 7/1976 |
| DE | 2804283 A1 | 8/1978 |
| DE | 3121385 A1 | 8/1982 |
| DE | 4240313 A1 | 6/1994 |
| DE | 19943642 A1 | 3/2001 |
| DE | 102004058083 A1 | 6/2006 |
| DE | 102007061052 A1 | 6/2009 |
| DE | 102009013960 A1 | 9/2010 |
| DE | 102016100567 A1 | 7/2016 |
| EP | 0464701 A2 | 1/1992 |
| EP | 0500496 A1 | 8/1992 |
| EP | 0517044 A2 | 12/1992 |
| EP | 0570165 A2 | 11/1993 |
| EP | 0839623 A1 | 5/1998 |
| EP | 1308084 A1 | 5/2003 |
| EP | 1342650 A1 | 9/2003 |
| EP | 1506249 A1 | 2/2005 |
| EP | 1582549 A1 | 10/2005 |
| EP | 2974848 A1 | 1/2016 |
| JP | 61-035835 U | 3/1986 |
| JP | 2004-161143 A | 6/2004 |
| JP | 2004-216746 A | 8/2004 |
| JP | 2011-127113 A | 6/2011 |
| JP | 2013-035367 A | 2/2013 |
| JP | 2016-503083 A | 2/2016 |
| JP | 61-223703 A | 10/2021 |
| WO | WO-9615102 A2 | 5/1996 |
| WO | WO-2002026862 A1 | 4/2002 |
| WO | WO-03095521 A1 | 11/2003 |
| WO | WO-2005113639 A1 | 12/2005 |
| WO | WO-2006108520 A1 | 10/2006 |
| WO | WO-2008037364 A1 | 4/2008 |
| WO | WO-2008071363 A2 | 6/2008 |
| WO | WO-2008109072 A1 | 9/2008 |
| WO | WO-2009085662 A2 | 7/2009 |
| WO | WO-2011144429 A1 | 11/2011 |
| WO | WO-2012080395 A1 | 6/2012 |
| WO | WO-2014095954 A1 * | 6/2014 ........... C08K 5/0041 |
| WO | WO-2014095981 A1 | 6/2014 |
| WO | WO-2015044911 A1 | 4/2015 |

OTHER PUBLICATIONS

Written Opinion of the International Searching Authority PCT/EP2017/079374 dated Jan. 3, 2018.
International Preliminary Report on Patentability received for PCT Patent Application No. PCT/EP2017/079374, dated May 31, 2019, 14 pages (8 pages of English Translation and 6 pages of Original Document).

\* cited by examiner

OPAQUE MULTI-LAYER BODY OF POLYCARBONATE FOR HEAT MANAGEMENT

CROSS-REFERENCE TO RELATED APPLICATIONS

This application is a national stage application (under 35 U.S.C. § 371) of PCT/EP2017/079374, filed Nov. 16, 2017, which claims benefit of European Application No. 16199350.6, filed Nov. 17, 2016, both of which are incorporated herein by reference in their entirety.

The invention relates to an opaque bodywork part, especially a roof module or part of a roof module, having a substrate layer based on polycarbonate suitable for shielding of a vehicle interior from insolation.

BACKGROUND OF THE INVENTION

Components based on thermoplastic material for use in the automotive sector offer many advantages over conventional materials, such as glass for example. These include, for example, elevated fracture resistance and/or a weight saving, which in the case of automobiles allow greater occupant safety in road traffic accidents and lower fuel consumption. Finally, materials containing thermoplastic polymers allow substantially greater freedom in design on account of their easier formability.

Since thermoplastic materials are generally transparent to IR radiation, it is necessary to provide them with thermal protection. For example, a vehicle interior, for instance a motor vehicle interior, should not heat up in an unpleasant manner if thermoplastic material is used for a roof module.

Thermoplastic materials may be modified in different ways with regard to the thermal protection effect.

For the purpose of heat management, thermoplastic materials can be equipped with IR-reflecting additives in order to reduce both the heating of the molded article and the transmission of thermal radiation into the interior. Systems of this kind are described, for example, in DE 102004058083 A1, WO 2011/144429 A1 or DE 102007061052 A1. However, the additives described therein cannot be incorporated, or at least not directly, into every thermoplastic material, for example into polycarbonate for instance.

For example, thermoplastic materials can be rendered opaque by pigments such as carbon black and hence absorb the corresponding electromagnetic radiation over a wide wavelength range, meaning that the materials do not allow the radiation to pass through the layer. However, materials of this kind heat up significantly as a result, and so these themselves can in turn release heat via convection, radiation or conduction of heat. These materials can reach high surface temperatures.

IR-reflecting pigments suitable for polycarbonate and corresponding molding compounds based on polycarbonate are also described in WO 2015/044911 A1. However, such systems frequently have inadequate weathering stability. As a result of the interaction with light, the IR-reflecting pigments in the polycarbonate matrix or, in the case of painted systems, in the outer layer above induce processes that lead to loss of color intensity or to a change in color and, in the case of the painted systems, to defects in the paint layer.

Integrating IR-reflecting additives into a polycarbonate substrate as described by WO 2015/044911 A1 is typically associated with relatively low weathering stability and, owing to the IR-reflecting pigments, to worsened visual brightness.

The integration of IR-absorbing additives contributes to heating of the polycarbonate substrate, which is associated with heating of the respective interior via convection, conduction of heat and possibly radiation of heat.

It is also known that the use of metal layers on transparent substrates such as glass or amorphous thermoplastic, directed toward the radiation source, can give IR-reflecting properties. These systems have been described for glass in particular, but can in principle be applied to thermoplastic systems, especially also to aromatic polycarbonate. Constructions of this kind comprising IR-reflecting metal layers are described, for example, in US 2015/0185382 A1. There have also been descriptions of IR-reflecting metal layers applied to transparent polymeric substrates in DE 102009013960 A1. Such film systems are typically applied to substrates such as glass. In order to obtain maximum weathering stability, these films, in the motor vehicle or mobility sector, are arranged between two composite glass panes—frequently laminated in combination with a further plastic. The metal systems are frequently applied atop a flexible polymer of one of the following types: PMMA, polyester, polyimide, polyethylene, polypropylene, polyamide, preferably polyethylene terephthalate (PET). In the latter case, the construction composed of thin layers may be applied to the flexible PET substrate and then a glazing system can be formed by bonding the flexible polymer to one or more glass substrates, especially via intermediate films of polyvinyl butyral, PVB. This type of flexible substrate is generally produced with a thickness of 5 to 50 µm. Such systems are described, for example, in EP 0 464 701 A2. Alternatively, the metal layer or the specific metal layer construction may also be sputtered directly onto a glass layer and then cohesively bonded to a second pane, optionally with inclusion of further films such as PVB. Here too, there is thus high weathering stability. In the architectural sector, double or triple glazing is frequently employed. Between the glass panes there is a gas filling for insulation, for example a noble gas filling. Here too, it is possible to apply an IR reflection layer, i.e. a metal layer construction, to one of the inner panes, in order to reflect IR radiation. Constructions of this kind are described, for example, in US 2002/037414 A1.

Systems having glass as substrate are not applicable without difficulty to thermoplastic polymers, for instance to polycarbonate, since polycarbonate has a lower barrier to oxygen and moisture. Moreover, polycarbonate has different properties with regard to modulus of elasticity and surface hardness. However, polycarbonate is superior to materials such as glass owing to its good mechanical properties. Moreover, a weight saving can be achieved compared to other materials such as glass.

BRIEF SUMMARY OF THE INVENTION

The present invention relates to opaque articles; by contrast, the above-described prior art describes solutions to problems for visually transparent substrates such as glass that are not applicable to opaque articles.

It would be desirable to be able to use opaque thermoplastic material, preferably based on aromatic polycarbonate or PMMA, especially based on aromatic polycarbonate, for motor vehicle exterior parts etc., and to achieve good heat management, without the surface of the components having a metallic appearance.

Motor vehicle exterior parts made of thermoplastic material employed in the motor vehicle, rail vehicle and aircraft sectors or in the infrastructure sector should also have a long service life and not undergo embrittlement during said service life, i.e. they should be stable to weathering. Color and surface (gloss effect) too should change only to a minimum degree. The thermoplastic parts should also ideally exhibit sufficient scratch resistance.

The problem addressed was therefore that of providing a bodywork part comprising a multilayer article having a substrate layer based on a thermoplastic material, preferably based on aromatic polycarbonate or polymethylmethacrylate (PMMA), more preferably based on aromatic polycarbonate, by means of which the radiative heating (especially by insolation) of vehicle interiors is perceptibly reduced, and the multilayer article of which is preferably likewise suitable for protecting another three-dimensional volume from radiative heating, where the multilayer article, even on its surface directed outward, toward the radiation source, should show only minor heating and should preferably ideally additionally have good weathering stability.

DETAILED DESCRIPTION OF THE INVENTION

The problem is solved by a bodywork part comprising a multilayer article, comprising, in this sequence,
a) optionally a protective layer a,
b) a substrate layer b based on a thermoplastic polymer having
light transmittance in the range from 380 to 780 nm of less than 1.0% determined at a layer thickness of 4 mm to DIN ISO 13468-2:2006 (D65, 10°) and
energy transmittance $T_{DS}$ of less than 40%, determined to ISO 13837:2008 at a layer thickness of 4 mm,
c) optionally a further layer c based on a thermoplastic polymer having a maximum thickness of 600 μm,
d) a metal layer d comprising at least one element selected from Ag, Al, Au, Pt, Fe, Cr, Sn, In, Ti, Pd, Nb, Cu, V, stainless steel or alloys thereof, having a thickness of 40 nm to 500 μm, and
e) optionally a protective layer e,
wherein
the metal layer d is disposed on the side of the multilayer article destined to be oriented toward the interior of the vehicle, and wherein
the layers that follow on from layer d, including protective layer e, have a total thickness of not more than 50 nm.

In the context of the present invention, preferred embodiments recited for individual features may also be combined with one another provided they are not contradictory.

"Following on from layer d" means all layers on the side of layer d) remote from the radiation source, i.e. especially the sun.

"Bodywork parts" form the outer skin of vehicles. The term "vehicle" here should be regarded as an umbrella term for all modes of transport for goods, tools and passengers. This includes land vehicles, for instance motor vehicles and rail vehicles, water vehicles, especially ships, and aircraft, especially aeroplanes.

It is a feature of the bodywork parts of the invention that they protect the respective interior, for example a passenger cell, from heating by insolation.

The multilayer article of the bodywork part of the invention may be equipped with further protective and/or bonding layers. In addition to the metal layer d, for protection from oxidation, further metal-containing layers may be present as well as a pure metal layer. However, the basic sequence of the inventive construction is characterized in that the metal layer is behind the substrate, preferably the PMMA or polycarbonate substrate, especially the polycarbonate substrate—i.e. on the side remote from the sun. The thermoplastic polymer, especially based on polycarbonate, in the form of the substrate layer preferably bears a protective layer a, where the protective layer faces the heat source.

Preferably, the multilayer article does not have any further layers between layers b to d except for bonding layers and/or protective layers in the form of metal oxide/metal nitride layers.

Further preferably, the multilayer article, aside from layers a to e, does not have any further layers apart from protective layers in the form of metal oxide/metal nitride layers and/or adhesive layers for bonding of the individual layers.

The layers that follow on from layer d, including protective layer e, preferably have a total thickness of not more than 40 nm, further preferably not more than 35 nm.

Alternatively, further preferably, what is called a black edge applied by means of two-component injection molding is part of the multilayer article.

There follows a detailed description of the individual layers of the multilayer article of a bodywork part of the invention:

Protective Layer a

Protective layer a preferably comprises a scratch-resistant lacquer (hard-coat). This is preferably a polysiloxane lacquer produced by the sol-gel process. Protective layer a more preferably also contains at least one UV absorber. Protective layer a preferably has high abrasion and scratch resistance and hence especially fulfills the function of a scratch-resistant coating.

Commercially available systems are, for example, AS4000, SHC5020 and AS4700 from Momentive Performance Materials. Such systems are described, for example, in U.S. Pat. No. 5,041,313 A, DE 3,1213,85 A1, U.S. Pat. No. 5,391,795 A and WO 2008/109072 A1. These materials are typically synthesized via condensation of alkoxy- and/or alkylalkoxysilanes under acid or base catalysis. Nanoparticles can optionally be incorporated. Preferred solvents are alcohols such as butanol, isopropanol, methanol, ethanol and mixtures of these.

Various methods for producing a scratch-resistant coating on plastics articles are known. These systems may be applied, for example, by dipping processes, spin-coating, spraying processes or flow coating, preferably by dipping or flow processes. Curing may be thermal or by means of UV irradiation. The scratch-resistant coating may be applied, for example, directly or after preparation of the substrate surface with a primer. A scratch-resistant coating may also be applied via plasma-assisted polymerization methods, for example via an $SiO_2$ plasma. Antifogging or antireflection coatings may likewise be produced via plasma processes. It is also possible to use certain injection molding processes, for example overmolding of surface-treated films, to apply a scratch-resistant coating on the resulting molded article. The scratch-resistant layer may include various additives, for example UV absorbers, derived from triazoles or from triazines, for example.

Protective layer a may thus be a single- or multilayer system and hence also a combination of two or more layers a', a" etc. More particularly, protective layer a may consist of the layers topcoat layer a' and primer layer a", with the primer layer arranged between the topcoat layer and substrate layer b.

In a preferred embodiment which achieves particularly good weathering stability, protective layer a comprises a
A) polysiloxane-based scratch-resistant coating (layer a') comprising
   i. at least one UV absorber from the group of benzophenones, resorcinols, 2-(2-hydroxyphenyl)benzotriazoles, hydroxyphenyl-s-triazines, 2-cyanoacrylates, oxalanilides
      and/or a UV inhibitor from the group of sterically hindered amines (HALS), in particular based on 2,2,6,6-tetramethylpiperidine or derivatives thereof;
   ii. at least one combination of an organomodified silane with a silica sol, wherein the organomodified silane may be a methyltrialkoxy- or dimethyldialkoxysilane;
and optionally, in a further-preferred embodiment, additionally a primer layer (layer a") disposed atop the substrate layer b and acting as adhesion promoter between the polysiloxane-based scratch-resistant coating and the substrate layer b, comprising
   at least one UV absorber from the group of benzophenones, 2-(2-hydroxyphenyl)benzotriazoles, resorcinols, hydroxyphenyl-s-triazines, 2-cyanoacrylates, oxalanilides and/or sterically hindered amines (HALS), in particular based on 2,2,6,6-tetramethylpiperidine and derivatives thereof,
   wherein the thickness of the primer layer is 0.3 m to 8 µm, preferably 1.1 µm to 4.0 µm.

"Derivatives" are understood in accordance with the invention to mean those compounds having a molecular structure having a different atom or a different atomic group in place of a hydrogen atom or a functional group or in which one or more atoms/atomic groups have been removed. The parent compound is thus still recognizable.

When the thermoplastic polymer on which substrate layer b is based is an aromatic polycarbonate, it is preferable to use a UV absorber-containing primer to improve the adhesion of the scratch-resistant coating on the substrate layer b. The primer may comprise further stabilizers, for example HALS systems (stabilizers based on sterically hindered amines), adhesion promoters and/or flow enhancers. The respective resin forming the base material of the primer layer may be selected from a multiplicity of materials and is described for example in Ullmann's Encyclopedia of Industrial Chemistry, 5$^{th}$ Edition, Vol. A18, pp. 368-426, VCH, Weinheim 1991. It is possible to use polyacrylates, polyurethanes, phenol-based systems, melamine-based systems, epoxy systems and alkyd systems, and mixtures of these systems. The resin is typically dissolved in suitable solvents—often in alcohols. Depending on the resin chosen, hardening can be effected at room temperature or at elevated temperatures. Preference is given to using temperatures between 50° C. and 140° C.—frequently after a majority of the solvent has been removed within a short period at room temperature. Examples of commercially available primer systems include SHP470, SHP470-FT2050 and SHP401 from Momentive Performance Materials. Such coatings are described for example in U.S. Pat. No. 6,350,512 B1, U.S. Pat. No. 5,869,185 A, EP 1308084 A1 and WO 2006/108520 A1.

The polysiloxane layer preferably contains organosilicon compounds having the formula $R_nSiX_{4-n}$ and/or partial condensates thereof,
where the R radicals are the same or different and are a linear or branched, saturated or mono- or polyunsaturated or aromatic hydrocarbyl radical,
the X radicals are the same or different and are hydrolyzable groups or hydroxyl groups, preferably halogen, especially chlorine or bromine, alkoxy groups, alkylcarbonyl groups or acyloxy groups, and
n is 0, 1, 2 or 3, preferably 1 or 2, most preferably 1.

R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbon atoms. The alkyl/alkenyl radicals more preferably have up to 12, yet more preferably up to 8, carbon atoms. More preferably, all radicals are methyl and/or phenyl.

More preferably, X is an alkoxy group, most preferably a $C_1$- to $C_4$-alkoxy group, for example a methoxy group or an ethoxy group.

The silicon compounds $R_nSiX_{4-n}$ are hydrolyzable and condensable via the X radicals. These hydrolytically condensable groups are used to construct an inorganic network comprising Si—O—Si units. In contrast to the X radicals, the R radicals are stable to hydrolysis under the typical condensation conditions.

When using the abovementioned siloxane systems, dry layer thicknesses of 3 µm-20 µm are preferred, further preferably 5 µm-15 µm, especially preferably 6 µm-12 µm. By "dry layer thickness" is meant the layer thickness of the coating after application, evaporation of the solvent and subsequent thermal or UV curing. This layer thickness is generally applicable to preferred protective layers a.

As described above, rather than primer/scratch-resistant coating combinations, it is also possible to use one-component hybrid systems that are either thermally curable or UV-curable for the multilayer articles.

These are described for example in EP 0570165 A2, WO 2008/071363 A2 or DE 2804283 A. Commercially available hybrid systems are obtainable for example under the name PHC 587, PHC 587C as thermally curable lacquers and under the name UVHC 3000 and UVHC 5000 as UV-curable lacquers from Momentive Performance Materials. Further commercially available UV-curing lacquer systems that are suitable in accordance with the invention are UVT 610 and UVT 820 from Redspot.

In a particularly preferred process for producing the multilayer articles for the bodywork parts of the invention, protective layer e is applied by means of the flow-coating process since it leads to coated parts having high optical quality.

The flow-coating process can be effected manually with a hose or suitable coating head or automatically in a continuous procedure by way of flow-coating robots and optionally slot dies.

Further possible methods of application are dipping, blade coating, rolling, spraying or spin-coating. The components may be coated here either while suspended or while mounted in an appropriate holder.

For larger and/or 3D components—i.e. components having a three-dimensional surface which thus have a geometry departing from that of a sheet—the part to be coated is suspended in or placed upon a suitable holder.

In the case of small parts, the coating procedure can also be carried out manually. This is done by pouring the liquid primer or lacquer solution to be layered, for formation of protective layer e, across the sheet proceeding from the upper edge of the small part in longitudinal direction, while the starting point of the lacquer on the sheet is simultaneously guided from left to right across the width of the sheet.

The lacquered sheets are aired and cured while suspended vertically from a clip according to the respective manufacturer's instructions.

The layer thickness of layers a and a' can be determined, for example, by white light interferometry (for example using a white light interferometer from Eta Optic; ETA-SST), which is preferred. Cross section preparation and microscope detection (by optical microscopy or scanning electron microscopy) of the layers may also be used to detect the thickness via material contrast.

Substrate Layer b

The substrate layer b of the multilayer articles of the bodywork parts of the invention consists of an opaque material, "opaque" being understood to mean a material having the transmittance mentioned in the VIS region. Such materials show no visual transparency, i.e. do not show the background.

Thermoplastic polymers used for the substrate layer b may in principle be any known thermoplastic polymers. Suitable polymers are, for example, polycarbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate, for example poly- or copolymethylmethacrylates (such as PMMA), and also copolymers with styrene, for example transparent polystyrene-acrylonitrile (PSAN), thermoplastic polyurethanes, polymers based on cyclic olefins (for example TOPAS®, a product commercially available from Ticona), polycarbonate blends with olefinic copolymers or graft polymers, for example styrenctacrylonitrile copolymers. The material of substrate layer b is a material based on these polymers. "Based on" here and elsewhere in the description of the present invention means that the overall composition described contains at least 70% by weight, preferably at least 80% by weight, further preferably at least 90% by weight, more preferably at least 95% by weight, of the respective polymer.

Thermoplastic materials suitable in accordance with the invention for production of the multilayer article of the invention are preferably aromatic polycarbonates, polyester carbonates, polyesters, PMMA, more preferably aromatic polycarbonates. With regard to the polyesters, preference is given to types constructed from raw materials including cyclohexanedimethanol and/or tetramethylcyclobutanediol. In terms of the polyester carbonates, preference is given to types constructed from the raw materials hydroquinone and/or terephthalic acid and/or isophthalic acid. In terms of the aromatic polycarbonates, all known aromatic polycarbonates are suitable. This includes homopolycarbonates and copolycarbonates. If reference is made to "polycarbonate" anywhere in the context of the present invention, what are meant are especially aromatic polycarbonates.

Polycarbonates suitable in accordance with the invention preferably have average molecular weights $\overline{M}_w$ of 10 000 to 50 000 g/mol, more preferably of 14 000 to 40 000 g/mol and especially preferably of 16 000 to 32 000 g/mol, determined by gel permeation chromatography to DIN 55672-1:2007-08, calibrated against bisphenol A polycarbonate standards using dichloromethane as eluent, calibration with linear polycarbonates (formed from bisphenol A and phosgene) of known molar mass distribution from PSS Polymer Standards Service GmbH, Germany, and calibration by method 2301-0257502-09D (2009 German-language edition) from Currenta GmbH & Co. OHG, Leverkusen. The eluent is dichloromethane. Column combination of cross-linked styrene-divinylbenzene resins. Diameter of the analytical columns: 7.5 mm; length: 300 mm. Particle sizes of the column material: 3 µm to 20 µm. Concentration of the solutions: 0.2% by weight. Flow rate: 1.0 ml/min, temperature of the solutions: 30° C. Detection using a refractive index (RI) detector.

Since the components may be relatively large and may have a complex geometry for the infrastructure or transport sector, the thermoplastic material should have sufficient flowability to be processible to give corresponding molded articles by the injection molding process, for example especially the injection-compression molding process. The melt volume flow rate MVR is therefore preferably 7 to 20 $cm^3/(10\ min)$, more preferably 9 to 19 $cm^3/(10\ min)$, determined according to ISO 1133-1:2011 at 300° C. and a loading of 1.2 kg.

The polycarbonates are preferably produced by the interfacial process or the melt transesterification process, which have been described many times in the literature.

With regard to the interfacial process, reference is made by way of example to H. Schnell, "Chemistry and Physics of Polycarbonates", Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Drs. U. Grigo, K. Kircher and P. R-Müller "Polycarbonate" [Polycarbonates] in Becker/Braun, Kunststoff-Handbuch [Polymer Handbook], volume 3/1, Polycarbonate, Polyacetale, Polyester, Celluloseester [Polycarbonates, Polyacetals, Polyesters, Cellulose Esters], Carl Hanser Verlag, Munich, Vienna, 1992, p. 118-145, and to EP 0 517 044 A1.

The melt transesterification process is described, for example, in the "Encyclopedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A and U.S. Pat. No. 6,228,973 B1.

The polycarbonates are preferably prepared by reactions of bisphenol compounds with carbonic acid compounds, especially phosgene, or of diphenyl carbonate or dimethyl carbonate in the melt transesterification process.

Particular preference is given here to homopolycarbonates based on bisphenol A and copolycarbonates based on the monomers bisphenol A and 1,1-bis(4-hydroxyphenyl)-3,3,5-trimethylcyclohexane, for example Apec® from Covestro Deutschland AG.

These and further bisphenol/diol compounds that are usable for polycarbonate synthesis are described inter alia in WO 2008/037364 A1 (page 7, line 21 to page 10, line 5), EP 1 582 549 A1 ([0018] to [0034]), WO 2002/026862 A1 (page 2, line 20 to page 5, line 14) and WO 2005/113639 A1 (page 2, line 1 to page 7, line 20).

The polycarbonates may be linear or branched. It is also possible to use mixtures of branched and unbranched polycarbonates.

Suitable branching agents for the production of branched polycarbonates are known from the literature and described for example in the patent documents U.S. Pat. No. 4,185,009 B and DE 25 00 092 A1 (3,3-bis(4-hydroxyaryloxindoles), see whole document in each case), DE 42 40 313 A1 (see page 3, lines 33 to 55), DE 19 943 642 A1 (see page 5, lines 25 to 34) and U.S. Pat. No. 5,367,044 B and in literature cited therein.

The polycarbonates used may additionally also be intrinsically branched, and in that case no branching agent is added in the course of polycarbonate preparation. An example of intrinsic branching is that of so-called Fries structures, as described for melt polycarbonates in EP 1 506 249 A1.

In addition, chain terminators may be used in polycarbonate preparation. Chain terminators used are preferably phenols such as phenol, alkylphenols such as cresol and 4-tert-butylphenol, chlorophenol, bromophenol or cumylphenol or a mixture thereof.

As well as individual polymers as base material, the substrate layer b may also contain polymer blends as base material. Blending partners suitable for aromatic polycarbonate are, for example, rubber-modified vinyl (co)polymers and/or further elastomers.

The compositions that form substrate layer b and are based on a thermoplastic polymer, preferably on aromatic polycarbonate, preferably contain one or more further customary additives. These are customary additives described, for example, in EP-A 0 839 623, WO-A 96/15102, EP-A 0 500 496 or "Plastics Additives Handbook", Hans Zweifel, 5th Edition 2000, Hanser Verlag, Munich, for example mold release agents, UV absorbers, heat stabilizers, flame retardants, antistats, colorants and/or flow enhancers.

The compositions more preferably contain mold release agents based on a fatty acid ester, preferably based on a stearic ester, especially preferably based on pentaerythritol. In a particular embodiment, pentaerythritol tetrastearate (PETS) and/or glycerol monostearate (GMS) is used.

Optionally, the composition used for substrate layer b further comprises an ultraviolet absorber. Suitable ultraviolet absorbers are compounds having the lowest possible transmittance below 400 nm and the highest possible transmittance above 400 nm. Such compounds and the preparation thereof are known from the literature and are described, for example, in EP 0 839 623 A1, WO 1996/15102 A2 and EP 0 500 496 A1. Ultraviolet absorbers particularly suitable for use in the composition according to the invention are benzotriazoles, triazines, benzophenones and/or arylated cyanoacrylates.

In one embodiment, the composition used for substrate layer b contains UV absorbers.

Examples of suitable ultraviolet absorbers are as follows: hydroxybenzotriazoles, such as 2-(3',5'-bis(1,1-dimethylbenzyl)-2'-hydroxyphenyl)benzotriazole (Tinuvin® 234, BASF AG, Ludwigshafen), 2-(2'-hydroxy-5'-(tert-octyl)phenyl)benzotriazole (Tinuvin®329, BASF AG, Ludwigshafen), 2-(2'-hydroxy-3'-(2-butyl)-5'-(tert-butyl)phenyl)benzotriazole (Tinuvin® 350, BASF AG, Ludwigshafen), bis(3-(2H-benzotriazolyl)-2-hydroxy-5-tert-octyl)methane, (Tinuvin® 360, BASF AG, Ludwigshafen), (2-(4,6-diphenyl-1,3,5-triazin-2-yl)-5-(hexyloxy)phenol (Tinuvin® 1577, BASF AG, Ludwigshafen), the benzophenones 2,4-dihydroxybenzophenone (Chimasorb® 22, BASF AG, Ludwigshafen) or 2-hydroxy-4-(octyloxy)benzophenone (Chimassorb® 81, BASF AG, Ludwigshafen), 2-cyano-3,3-diphenyl-2-propenoic acid, 2,2-bis[[(2-cyano-1-oxo-3,3-diphenyl-2-propenyl)oxy]methyl]-1,3-propanediyl ester (9CI) (Uvinul® 3030, BASF AG, Ludwigshafen), 2-[2-hydroxy-4-(2-ethylhexyl)oxy]phenyl-4,6-di(4-phehenyl-1,3,5-triazine (CGX UVA 006, BASF AG, Ludwigshafen) or tetraethyl 2,2'-(1,4-phenylenedimethylidene)bismalonate (Hostavin® B-Cap, Clariant AG). It is also possible to use mixtures of these ultraviolet absorbers.

In a preferred embodiment, the polymer composition further comprises at least one further thermal stabilizer or processing stabilizer.

Phosphites and phosphonites are preferentially suitable, as are phosphines. Examples include triphenyl phosphite, diphenyl alkyl phosphite, phenyl dialkyl phosphite, tris (nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis (2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyldibenzo[d,g]-1,3,2-dioxaphosphocine, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane or a trinaphthylphosphine. Especially preferably, triphenylphosphine (TPP), Irgafos® 168 (tris(2,4-di-tert-butylphenyl) phosphite) or tris(nonylphenyl) phosphite or mixtures thereof are used. It is also possible to use alkyl phosphates, for example mono-, di- and trihexyl phosphate, triisooctyl phosphate and trinonyl phosphate.

It is also possible to use phenolic antioxidants such as alkylated monophenols, alkylated thioalkylphenols, hydroquinones and alkylated hydroquinones. Particular preference is given to using Irganox® 1010 (pentaerythritol 3-(4-hydroxy-3,5-di-tert-butylphenyl)propionate; CAS: 6683-19-8) and/or Irganox 1076® (2,6-di-tert-butyl-4-(octadecanoxycarbonylethyl)phenol).

Suitable colorants are in particular anthraquinone-based, perinone-based, phthalocyanine-based colorants or colorants derived from these structures. Particularly preferred colorants are described in WO 2012/080395 A1. Colorants used may also be Macrolex Violet 3R (CAS 61951-89-1; Solvent Violet 36), Macrolex Green SB (CAS 128-80-3; Solvent Green 3; C.I. 61565), Amaplast Yellow GHS (CAS 13676-91-0; Solvent Yellow 163; C:I: 58840), Macrolex Orange 3G (CAS 6925-69-5; Solvent Orange 60; C.I. 564100), Macrolex Blue RR (CAS 32724-62-2; Solvent Blue 97; C.I. 615290); Keyplast Blue KR (CAS 116-75-6; Solvent Blue 104; C.I. 61568), Heliogen Blue types (e.g. Heliogen Blue K 6911; CAS 147-14-8; Pigment Blue 15:1; C.I. 74160), Heliogen Green types (for example Heliogen Green K 8730; CAS 1328-53-6; Pigment Green 7; C.I. 74260) and Macrolex Green G (CAS 28198-05-2; Solvent Green 28; C.I. 625580).

The substrate layer b has a light transmittance $T_{VIS}$ in the range from 380 to 780 nm (VIS region of the spectrum) of less than 1.0%, preferably less than 0.5%, more preferably less than 0.10/%, determined at a layer thickness of 4 mm to DIN ISO 13468-2:2006 (D65, 100).

Substrate layers based on aromatic polycarbonate that have the above-described transmittance data can be produced by using soluble colorants that can be taken from the enumeration described above. For example, polycarbonates as described in WO 2014/095981 A1 inter alia are suitable as substrate material. Preferably, the compositions based on aromatic polycarbonate contain anthraquinone dyes or perinone dyes or a combination of perinone and anthraquinone dyes.

Particularly preferred polycarbonate compositions contain two or three structurally different colorants, for example two or three anthraquinone-based colorants of different structure or a combination of perinone and anthraquinone dyes.

Especially preferably, the composition contains at least one green or blue colorant in combination with at least one red or violet colorant. It is optionally possible to use further colorants—especially preferably including yellow colorants. This means that a colorant selected from the colorants of structures (1), (2a-c), (3), (4), (5) and (6), especially preferably (1), (2a-c), (3) and (4), is preferably used together with a colorant selected from structures (7) to (13), preferably selected from structures (7), (11) and (12), and optionally containing further colorants, preferably selected from structures (14) to (18), especially preferably selected from structures (14) and (15).

Green colorants are especially preferably colorants of the structures (1) and (2a/2b/2c):

(1)

(2a)

(2b)

(2c)

The colorant of the structure (1) is known by the Macrolex Green 5B name from Lanxess Deutschland GmbH, Color Index number 61565, CAS Number: 128-90-3, and is an anthraquinone dye.

A preferred colorant from the group (2a/2b/2c) is Macrolex Green G (Solvent Green 28), (Structure (2a)).

Blue colorants that are used are preferably colorants of the structures (3) and/or (4a/4b):

(3)

available under the "Keyplast Blue KR" name, CAS Number 116-75-6, Color Index Number: 61568;

(4a)

(4b)

where

Rc and Rd are independently a linear or branched alkyl radical or halogen, preferably methyl, ethyl, propyl, isopropyl, butyl, isobutyl, tert-butyl, pentyl, neopentyl, hexyl, thexyl, or Cl, further preferably methyl, Cl and especially preferably Cl, n independently of the respective R is a natural number from 0 to 3, where the radical is hydrogen when n=0.

In a preferred embodiment, Rc and/or Rd are Cl and are in o and/or p positions relative to the carbon atoms bearing the amino functionalities, for example di-orthochloronapthalino, di-ortho, mono-para-chloronaphthalino and mono-ortho-naphthalino. In addition, in a preferred embodiment, Rc and Rd are each a tert-butyl radical which is preferably in the meta position relative to the carbon atoms bearing the nitrogen functionalities.

In a particularly preferred embodiment, n=0 in all rings, and so all Rc and Rd=H.

Further usable blue colorants include:

Colorants of the structure (5) available under the "Macrolex Blue 3R Gran" name

(5)

and/or colorants of the structure (6) available under the "Macrolex Blue RR" name

(6)

The red colorant used is preferably a colorant of the structure (7) available under the "Macrolex Red SB" name having CAS Number 81-39-0:

(7)

It is also possible to use colorants of the structures (8) having CAS Number 71902-17-5 and/or (9) having CAS Number 89106-94-5:

(8)

(9)

Violet colorants used are preferably colorants of the structures (10) having CAS Number 61951-89-1, (11) available under the "Macrolex Violet B" name from Lanxess AG having CAS Number 81-48-1 and/or (12a/12b) available under the "Amaplast Violet PK" name:

(10)

(11)

where R is selected from the group consisting of H and p-methylphenylamine radical; preferably R=H;

(12a)

(12b)

where
- Ra and Rb are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and more preferably Cl,
- n independently of the respective R is a natural number from 0 to 3, and the radical is hydrogen when n=0.

In a preferred embodiment, Ra and/or Rb are Cl and are in o and/or p positions relative to the carbon atoms bearing the amino functionalities, for example di-orthochloronapthalino, di-ortho, mono-pera-chloronaphthalino and mono-ortho-naphthalino. In addition, in a preferred embodiment, Ra and Rb are each a tert-butyl radical which is preferably in the meta position relative to the carbon atoms bearing the nitrogen functionalities.

In a particularly preferred embodiment, n=0 in all rings, and so all Ra and Rb=H.

It is also possible to use colorants that conform to the structure (13), available under the "Macrolex RedViolet R" name, CAS Number 6408-72-6:

(13)

Yellow colorants used are preferably colorants of the structures (14) available under the "Macrolex Yellow 3G" name having CAS Number 4702-90-3 and/or (15), especially (15a), available under the "Macrolex Orange 3G" name having CAS Number 6925-69-5:

(14)

(15)

where R3 is preferably H or halogen, and especially preferably H or Cl, more preferably (15a)

It is also possible to use colorants of the structures (16) available under the "Oracet Yellow 180" name having CAS Number 13676-91-0, (17) having CAS Number 30125-47-4 and/or (18) available under the "Oracet Orange 220; Solvent Orange 116" name having CAS Number 669005-94-1.

(16)

(10)

and Macrolex Green SB from Lanxess AG, Color Index Number 61565, likewise an anthraquinone dye:

(17)

(1)

(18)

for example 0.1% by weight of each of these two colorants, based on the overall composition of the material of the substrate layer.

The composition for the substrate material has to be processible at the temperatures customary for thermoplastics, i.e. at temperatures above 300° C., for example 350° C., without undergoing marked changes in optical properties or mechanical properties during processing.

Even though carbon black has significant absorption in the IR region, a distinction is made in this application between carbon black and (other) IR absorbers ("IR absorbers other than carbon black").

A preferred substrate layer b is IR-transparent (i.e. the substrate layer b exhibits no appreciable absorption between 780 and 2500 nm save for the absorption bands attributable to the polymer, in particular the polycarbonate, itself; i.e. the average transmittance of the substrate layer in the range between 780 and 2500 nm is at least 10%, preferably at least 30%, more preferably at least 50%), contains less than 0.001% by weight of carbon black, further preferably less than 0.0001% by weight of carbon black, preferably no carbon black at all, and preferably less than 0.001% by weight, more preferably less than 0.0001% by weight, of IR absorbers other than carbon black and especially no IR absorbers other than carbon black. Average transmittance is understood to mean the arithmetic average of the transmittance measured to ISO 13468-2:2006.

Preferably, the colorants of the composition of substrate layer b are selected exclusively from the colorants (1) to (18).

The sum total of all colorants is preferably >0.05% by weight, preferably >0.08% by weight, further preferably >0.9% by weight, even further preferably >0.10% by weight, more preferably >0.11% by weight and most preferably >0.12% by weight, based on the overall composition of the substrate material. More preferably, the composition is free of carbon black.

The low transmittance mentioned is found, for example, for compositions comprising the colorant combination of Macrolex Violet 3R from Lanxess AG, Color Index Number 61102, an anthraquinone dye:

In this embodiment, light transmittance in the range from 380 to 780 nm, i.e. in the VIS region, is less than 1.0%, preferably 0%, determined at a layer thickness of 4 mm to DIN ISO 13468-2:2006 (D65, 100) and the $T_{DS}$ value determined to ISO 13837:2008 at a layer thickness of 4 mm is less than 40%, preferably less than 38%.

Particular preference is given in accordance with the invention to the use of such an IR-transparent substrate layer, especially one based on polycarbonate.

IR absorbers other than carbon black, which can be used alone or in a mixture, are, for example, tungstates, especially cesium tungstate or zinc-doped cesium tungstate, borides such as LaB, ATO (antimony tin oxide) or ITO (indium tin oxide). Also known are organic IR absorbers. Suitable IR-absorbing organic compounds have been described by substance classes, for example, in M. Matsuoka, Infrared absorbing dyes, Plenum Press, New York, 1990. Particularly suitable examples are those from the substance classes of the phthalocyanines, the naphthalocyanines, the perylenes, the quaterylenes, the metal complexes, the azo dyes, the anthraquinones, the squaric acid derivatives, the immonium dyes and the polymethines. Among these, phthalocyanines and naphthalocyanines are very particularly suitable.

Owing to their thermal stability, phthalocyanines and naphthalocyanines are particularly suitable NIR dyes. Owing to improved solubility in thermoplastics, phthalocyanines and naphthalocyanines with bulky side groups are preferable.

Mixtures of different NIR absorbers are also suitable.

An alternatively preferred substrate layer b is carbon black-filled. In this embodiment, light transmittance in the range from 380 to 780 nm, i.e. in the VIS region, determined at a layer thickness of 4 mm to DIN ISO 13468-2:2006 (D65, 10°), is less than 1.0%, preferably 0%, and the TDs value determined to ISO 13837:2008 at a layer thickness of 4 mm is less than 1%. The substrate layer b here preferably contains at least 0.04% by weight of carbon black, further preferably at least 0.08% by weight, more preferably at least 0.15% by weight of carbon black.

The production of three-dimensional substrate layers b, but also sheetlike layers, proceeding from the above-described polymer composition comprising the abovementioned components is effected by commonly used incorporation methods by combining, mixing and homogenizing, and the homogenizing in particular takes place preferably in the melt under the action of shear forces. To this end, the thermoplastic polymer, preferably aromatic polycarbonate, and any further components of the polymer molding material, preferably of the polycarbonate molding material, are mixed, extruded and granulated in the melt under customary conditions in customary melt mixing assemblies, for example in single-screw or multi-screw extruders or in kneaders. The additives may be metered in either separately as granules/pellets via weigh feeders or side feed devices or else metered at a suitable location into the solids conveying region of the extruder or into the polymer melt at elevated temperature as a melt by means of metering pumps. The masterbatches in the form of granules or pellets may also be combined with other particulate compounds to afford a premixture and then supplied together into the solids conveying region of the extruder or into the polymer melt in the extruder via metering hoppers or side feed devices. The compounding assembly is preferably a twin-screw extruder, particularly preferably a twin-screw extruder having corotating screws, wherein the twin-screw extruder preferably has a screw length/diameter ratio of 20 to 44, particularly preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, particularly preferably not more than 200 mbar, is established. The average residence time of the mixture composition in the extruder is preferably limited to not more than 120 seconds, more preferably not more than 80 seconds, more preferably not more than 60 seconds. In a preferred embodiment, the temperature of the melt of the polymer/of the polymer alloy at the extruder outlet is 200° C. to 400° C.

In addition to extrusion, the compositions used for substrate layer b may be converted to substrate layer b by hot compression molding, spinning, blow-molding, thermoforming or injection molding. Injection molding or injection-compression molding is preferred here.

Injection molding processes are well known to those skilled in the art and are described, for example, in "Handbuch Spritzgieeln" [Injection Molding Handbook], Friedrich Johannnaber/Walter Michaeli, Munich; Vienna: Hanser, 2001, ISBN 3-446-15632-1 or in "Anleitung zum Bau von SpritzgieBwerkzeugen" [Introduction to the Construction of Injection Molds], Menges/MichaelilMohren, Munich; Vienna: Hanser, 1999, ISBN 3-446-21258-2.

Injection molding here encompasses all injection molding processes including multicomponent injection molding and injection-compression molding processes.

Injection-compression molding processes differ from conventional injection molding processes in that the injection and/or solidification procedure includes mold plate movement. In the known injection-compression molding process, the mold plates are already opened slightly before the injection procedure to compensate for the shrinkage occurring during subsequent solidification and to reduce the required injection pressure. A pre-enlarged cavity is therefore already present at the beginning of the injection procedure. Flash faces of the mold ensure that the pre-enlarged cavity is still sufficiently leaktight even when the mold plates have been opened a little. The plastics material is injected into this pre-enlarged cavity and is simultaneously/subsequently compressed as the mold moves towards the closed position. Particularly in the production of large surface area and thin-walled moldings having long flow paths, the more complex injection-compression molding technique is preferred or in some cases essential. Only in this way is reduction in the injection pressures required for large moldings achieved. Furthermore, stresses/warpage in the injection-molded part that result from high injection pressures can be avoided by injection-compression molding.

Substrate layer b preferably has a thickness of 1.0 mm to 7.0 mm, further preferably of 2.0 mm to 6.0 mm, more preferably of 3.0 mm to 5.5 mm.

The thickness of layer b is preferably determined by means of micrometer calipers.

Layer c

As well as layer b, an additional layer c of thermoplastic may be present.

Suitable thermoplastics for optional layer c are preferably aromatic polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), aliphatic polyolefins such as polypropylene or polyethylene, cyclic polyolefin, poly- or copolyacrylates or poly- or copolymethacrylate, for example poly- or copolymethylmethacrylates (such as PMMA), and also copolymers with styrene, for example transparent polystyrene-acrylonitrile (PSAN), thermoplastic polyurethanes, polymers based on cyclic olefins (for example TOPAS®, a product commercially available from Ticona), polycarbonate blends with olefinic copolymers or graft polymers, for example styrene/acrylonitrile copolymers.

Particularly preferred are PMMA, PET, PEN, PETG, polycarbonate, copolycarbonate or polyester carbonate. PMMA, PET or PEN is very particularly preferred. The abovementioned polymers may be used alone or in mixtures.

Layer c has a thickness of up to 600 µm, preferably up to 500 µm. Layer c may also be a sequence of two or more layers, where the total thickness thereof does not exceed the limits mentioned.

Preferred film thicknesses of thermoplastic layer c are 10 µm to 500 µm. Particularly preferred film thicknesses are 20 µm to 250 µm. Very particular preference is given to 25 µm- to 125 µm-thick films as carrier material in order to apply the metal layer d, since particular preference is given to applying layer c together with the metal layer d to substrate layer b. The combination of metal layer d and layer c is preferably a metal layer that has been applied to a layer c of thermoplastic material as carrier material, especially based on a polyester, most preferably based on polyethylene terephthalate.

Layer c may be applied to layer b by processes known to those skilled in the art. In particular, multicomponent injection molding or adhesive bonding is suitable.

The layer thickness of layer c can be detected, for example, by means of a film thickness measuring instrument or via cross section preparation and microscope detection (by optical microscopy or scanning electron microscopy) of the layers via material contrast the thickness.

Metal Layer d

Metal layer d is disposed on the side of substrate layer b destined to be oriented toward the vehicle interior. In a roof module or the part of a roof module as bodywork part, this is the underside. The metal layer covers substrate layer b completely, or completely at least in the part of the multilayer article not covered by black edges or frame elements in the edge region of the bodywork part.

As well as the advantageous effect on heat management, the positioning of the metal layer on the side of the substrate layer b facing away from the sun has the advantage that the metal layer is protected from weathering effects.

In the simplest case, the metal layer has a fully reflective configuration analogously to a mirror layer. As well as the relevant vacuum methods for application of the metal layers, especially sputtering methods, other conceivable methods are those of galvanization and wet-chemical deposition.

The processes are described in detail, for example, in "Vakuumbeschichtung Bd.1 bis 5" [Vacuum Coating Vol. 1 to 5], H. Frey, VDI-Verlag Düsseldorf 1995 or in "Oberflächen- und Dünnschicht-Technologie" [Surface and Thin-Film Technology] Part 1, R. A. Haefer, Springer Verlag 1987.

In order to achieve better metal adhesion and in order to clean the substrate surface, the surface to be coated is normally subjected to a plasma pretreatment. A plasma pretreatment can under some circumstances change the surface properties of polymers. These methods are described, for example, in Friedrich et al. in "Metallized plastics 5&6: Fundamental and applied aspects" and in H. Grünwald et al. "Surface and Coatings Technology, 111 (1999), 287-296".

The metal layer preferably contains at least one element selected from Ag, Al, Au, Pt, Fe, Cr, Sn, In, Ti, Pd, Nb, Cu, V, stainless steel or alloys thereof. The layer is preferably an aluminum layer, a silver layer or a copper layer, most preferably a silver layer. The metal layer is preferably bounded on one or both sides by one or more metal oxide or metal nitride layers that enable the homogeneous deposition of metal and/or protect the metal as protective layer or sacrificial layer. According to the invention, these layers do not form part of the actual metal layer. Suitable oxides and/or nitrides are especially aluminum oxide, titanium dioxide, silicon oxide $SiO_x$, tantalum pentoxide $Ta_2O_5$, zirconium oxide, zirconium dioxide, niobium oxide, hafnium oxide, zinc tin oxide, indium tin oxide, aluminum zinc oxide, silicon nitride, boron nitride or titanium nitride. However, these layers do not form part of the metal layer, but are arranged between layers c and d or else on the underside of the bodywork part, i.e. the side, remote from the sun, of the metal layer d.

The metal layer may also comprise two or more metal layers d', d", the thicknesses of which add up to the total thickness of the metal layer d. These may form a layer sequence with metal oxide/nitride layers.

A metal layer d suitable in accordance with the invention, in one embodiment, is composed of a metal layer, especially a metal layer of silver or aluminum, optionally arranged between two coatings, which do not form part of the metal layer, of a dielectric material such as metal oxide or metal nitride. Such a construction is generally produced by a sequence of deposition operations that are implemented by a vacuum method, such as optionally magnetic field-assisted cathode atomization or vapor deposition methods. It is also possible to apply two very fine metal layers on either side of the silver layer, the lower layer as bonding or nucleation layer and the outer layer as sacrificial layer, in order to prevent the oxidation of the silver, when the dielectric layer that goes atop it consists of an oxide which is applied by reactive cathode atomization or reactive vapor deposition in the presence of oxygen.

One example of a corresponding sequence of metals or alloys and/or oxides on the substrate layer is substrate/tin oxide/NiCr/silver/NiCr/tin oxide.

A further example is substrate/tin oxide/silver/copper/tin oxide.

A further layer sequence is "substrate/tin oxide/zinc oxide/titanium oxide/(indium tin oxide or bismuth oxide)/(silver or a silver alloy containing 5% to 10% by weight of copper and/or titanium or stainless steel (e.g. 316)/tin oxide/zinc oxide/titanium oxide/indium tin oxide or bismuth oxide".

A further layer sequence is substrate/zinc oxide/niobium/silver/niobium/zinc oxide/silicon nitride or are further combinations of this sequence.

A suitable layer sequence commences with the substrate, followed by a 20 nm- to 50 nm-thick dielectric layer such as titanium oxide, tin oxide, $Si_3N_4$ or zinc oxide (sputtering layer). The refractive index is preferably 2.0 to 2.5. The third layer is a thin barrier layer (0.5-1.5 nm) or bonding layer/joining layer of a nickel-chromium alloy, nickel chromium nitride (NiCrNx) or titanium. In some applications, this layer is also omitted. A fourth layer especially consists of a silver layer having a thickness of about 6 to 20 nm, which is transparent. The fifth layer is a protective or sacrificial layer of nickel-chromium alloy, NiCrNx, or titanium. The titanium layer may optionally have been oxidized. A sixth layer, a protective or passivating layer, typically consists of silicon nitride ($Si_3N_4$), tin oxide or titanium oxide, especially in thickness 25 to 45 nm. All thin layers are applied by a sputtering methodology or reactive sputtering.

If a metal oxide layer or a metal nitride layer forms the outer, lower layer of the multilayer article, the multilayer article preferably does not comprise any protective layer e since the metal oxide layer itself acts as sacrificial layer.

Various modifications may be undertaken on the above-mentioned layer structure. For example, two layers of silver may be used or different layer thicknesses may be used. In this way, it is possible to achieve various visual effects, for example a dark gray color or a mirror effect or a bronzelike color impression.

The total thickness of the metal layer d is from 40 nm to 500 µm, preferably 50 nm-10 µm, further preferably 65 nm-1000 nm, most preferably 70 nm to 200 nm. The $T_{DS}$ value of the multilayer article is preferably less than 1%, determined to ISO 13837:2008.

If the metal layer is an aluminum layer or a combination of multiple aluminum layers, optionally interrupted by oxide or nitride layers as protective layers, the total thickness of the metal layer—without the oxide or nitride layers—is preferably at least 70 nm. For silver the preferred minimum thickness is 120 nm, for titanium 145 nm, for chromium 150 nm, for gold 175 nm and for copper 185 nm.

The layer thickness of layer d can be detected, for example, by means of surface resistance measurement or via cross section preparation and microscope detection (by optical microscopy or scanning electron microscopy) of the layers via material contrast the thickness.

Optional Protective Layer e

Protective layer e, which may be composed of one or more layers e', e" etc., means protective layers that protect the metal layer or metal-like layers beneath from external influences, i.e. protect them from corrosion or else from other external influences such as detergents, scratches etc., and are not a metal oxide or metal nitride layer. Such protective layers may be applied in a PECVD (plasma-enhanced chemical vapor deposition) process or plasma polymerization process. In this case, low-boiling precursors, especially siloxane-based precursors, are evaporated into a plasma and hence activated such that they can form a film. Typical substances here are hexamethyldisiloxane (HMDSO), tetramethyldisiloxane, decamethylcyclopentasiloxane, octamethylcyclotetrasiloxane and trimethoxymethylsilane, particular preference being given to hexamethyldisiloxane.

Preferably, layer e is a siloxane-containing layer, further preferably a hexamethyldisiloxane-containing layer, more preferably a plasma polymer layer containing hexamethyldisiloxane.

In one embodiment, the protective layer e is formed from a conductive layer, for example from an ITO-containing layer; the layer here contains preferably more than 50% ITO. Further useful conductive layers are those of zinc sulfide, silver chloride, zinc selenide and cadmium telluride.

The thickness of protective layer e in total is not more than 50 nm, preferably less than 50 nm, most preferably less than 35 nm. Preferably, the metal layer, for protection from oxidation or other damage, is provided with one or more further layers e', e" etc. that form the protective layer e.

Protective layer e preferably does not contain any metal. Protective layer e, just like protective layer a, may be a scratch-resistant coating.

Preferably, protective layer e, or metal layer d when no protective layer e is present, which is a preferred embodiment in the case of metal layers of gold and/or platinum, is not followed by any further layer. Most preferably, the multilayer article of the bodywork part of the invention does not comprise any layers apart from layers a, b, optionally c, d, optionally e and any adhesive layers present.

For the adhesive layers, for instance for joining of layers b and c, adhesives used are preferably what are called PSAs, pressure-sensitive adhesives. PSAs are understood to mean adhesives that are permanently tacky even at room temperature and have innate adhesion to other surfaces. This adhesion already occurs on exertion of a gentle pressure, as can be exerted by the force of a finger, for example.

Compound classes for PSAs are, for example, acrylates, polyurethanes, polyalphaolefins, silicones or tackified natural or synthetic rubber.

In addition, it is possible to use tackified OTP as adhesive, as described in U.S. Pat. No. 7,371,464 B2 (Sherman et al.).

Further preferred adhesives are "non-silicone-based pressure-sensitive adhesives", which are described inter alia in WO 2009/085662 A2 entitled "Urea-Based Pressure Sensitive Adhesives" and in US 2012/0100326 A1 entitled "Urethane-Based Pressure Sensitive Adhesives".

In the context of the invention, preference is given to adhesives from the class of the visually clear pressure-sensitive acrylic adhesives. Commercially available acrylic adhesives are Laminating Adhesive 8141 or Laminating Adhesive 8171, 8172 and 8173D from 3M.

The adhesive composition may, for example, be a pressure-sensitive adhesive, a heat-curing adhesive, a hotmelt adhesive or a combination of these.

The layer thickness of layer e may be detected, for example, by means of a surface profiler (e.g. KLA Tencor Alpha-Step 500 Surface Profiler from Tencor Instruments) or via cross section preparation and microscope detection (by optical microscopy or scanning electron microscopy) of the layers via material contrast the thickness.

As well as the layers described, the multilayer article may optionally comprise one or more further functional, joining or protective layers that do not contain any metal.

In particular, the multilayer article of the bodywork part of the invention may have a black edge/reinforcing frame elements. A black edge is a nontransparent layer, preferably made of a polymer blend, more preferably made of a polycarbonate blend, in particular comprising polycarbonate as the predominantly present component. Such a nontransparent layer is in direct contact with the above-described layer construction comprising layers a) to e) over broad areas.

The black edge is either outside layer sequence a) to e) or between layers a) and b) or d) and e).

It is preferable when this nontransparent material comprises/frames the substrate layer b and/or further layers directly or indirectly joined thereto or alternatively the entire multilayer construction completely or partially in the edge regions. When the nontransparent material is matched to the shape, the transition of the materials is preferably in edge regions, such that any unevenness that occurs is concealed. In every case there are regions in which the substrate layer b lies atop the nontransparent layer or the nontransparent layer lies atop the substrate layer b. What is meant here by "lies atop" is overlapping of the layers when looking at the multilayer article at right angles to the joining surface of the individual layers. It will be appreciated that the nontransparent layer need not be but may be in direct contact with the substrate layer b since it may be arranged behind further layers, for instance layer c.

Materials suitable for the production of black edges or reinforcing frame elements are the use of thermoplastics containing fillers/reinforcers, in particular the use of plastics blends provided with such additives. Blends containing polycarbonate and at least one other thermoplastic are preferred in this context.

The fillers and reinforcers used may be fibrous, lamellar, tubular, elongate or spherical, or particulate. Examples of fillers and reinforcers suitable in the context of the present invention include talc, wollastonite, mica, kaolin, kieselguhr, calcium sulfate, calcium carbonate, barium sulfate, glass fibers, glass spheres, ceramic spheres, hollow glass spheres, hollow ceramic spheres, glass wool, mineral wool, carbon fibers and carbon nanotubes. Preferred fillers are fillers which bring about isotropic shrinkage of the composition.

The use of talc and short glass fibers is particularly preferred in the context of the present invention.

Glass spheres or ceramic spheres, or hollow glass spheres or hollow ceramic spheres, can increase the scratch resistance of said surface.

In the compositions of substrate layer b, if fillers and/or reinforcers are present, the proportion thereof is preferably 5% by weight to 40% by weight, preferably 7% by weight to 30% by weight, more preferably 8% by weight to 25% by weight, wherein the weight figures are based on the overall composition of the substrate layer b).

A preferred bodywork part of the invention comprises a multilayer article comprising, in this sequence,
a) optionally a protective layer a,
b) a substrate layer b having a thickness of 1.0 to 7.0 mm based on a thermoplastic polymer, preferably aromatic polycarbonate, having
light transmittance in the range from 380 to 780 nm of less than 1.0% determined at a layer thickness of 4 mm to DIN ISO 13468-2:2006 (D65, 10°) and
energy transmittance $T_Ds$ of less than 40%, determined to ISO 13837:2008 at a layer thickness of 4 mm,
wherein the composition of the substrate layer contains >0.08% by weight of colorants,
c) optionally a further layer c based on a thermoplastic polymer having a maximum thickness of 600 μm,
d) a metal layer d comprising at least one element selected from Ag, Al, Au, Pt, Fe, Cr, Sn, In, Ti, Pd, Nb, Cu, V, stainless steel or alloys thereof, having a thickness of 40 nm to 500 μm, and
e) optionally a protective layer e,
wherein
the metal layer d is disposed on the side of the multilayer article destined to be oriented toward the interior of the vehicle, and wherein
the layers that follow on from layer d, including protective layer e, have a total thickness of not more than 50 nm.

Particularly preferred embodiments of this bodywork part will be apparent from the variants emphasized for the individual features as "preferred", "further preferred" etc.

The bodywork parts of the invention comprising the opaque multilayer articles described are suitable for infrastructure or mobility applications for land vehicles, for water vehicles and for air vehicles, and can be used therein for solar heat management, preferably as roof modules or parts of roof modules. It is a feature of the bodywork parts of the invention that they protect the respective interior, for example a passenger cell, from heating by insolation.

The bodywork parts of the invention can be used wherever protection from thermal radiation is important, especially protection from insolation. In principle, such components could alternatively be used in occupational hygiene, where the aim is protection from radiation from industrially produced heat sources.

The invention thus also provides roofs or roof modules, sunvisors, linings, frames, especially roofs or roof modules, especially for use in motor vehicles and rail vehicles, water vehicles and air vehicles, especially in motor vehicles, composed of or comprising the bodywork parts of the invention.

In vehicle construction, bodywork parts comprising or made of the opaque multilayer articles may be applied to any desired carrier systems made of metal or plastic. This may be achieved by means of special adhesive systems, for example polyurethane-based adhesive systems.

Large-area systems, for example roof modules made of the abovementioned multilayer articles, are preferably constructed such that the reverse side, i.e. layer d, optionally with layer e, is not visible.

In this case, as well as the abovementioned carrier systems, lining materials such as cotton, PU foam etc. are also used for lining of the respective module. Linings of this kind are mounted such that a gap of a few mm is left between layer d and the lining material in order not to impair the effect of the multilayer article. Thus, layer d and optionally layer e must not be bonded to the abovementioned materials over a large area.

Figure 1:
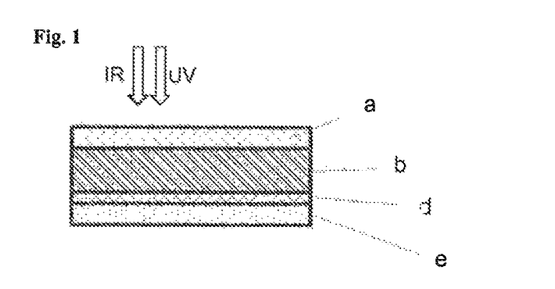
FIG. 1 is a cross-sectional view of a multilayer article according to the invention.

More specifically, FIG. 1 shows a bodywork part of the invention, for instance a section of a roof module, especially of a motor vehicle, on which radiation emitted by the sun is incident. The radiation that hits the multilayer article comprises radiation from the VIS region of the spectrum, i.e. about 380 nm to 780 nm, and IR radiation. The multilayer article comprises a scratch-resistant coating—protective layer a, the substrate layer b, a metal layer d and a protective layer e for protection of metal layer d from corrosion. Metal layer d is on the opposite side of substrate layer b from the radiation source against which shielding is effected, the sun in the case of a roof module.

EXAMPLES

There follows a detailed description of the invention with reference to working examples, the methods of determination described here being used for all corresponding parameters in the present invention description unless stated otherwise.

Substrate 1: Polycarbonate from Covestro Deutschland AG having an MVR of about 12 cm$^3$/(10 min), measured at 300° C. and load 1.2 kg (to ISO 1133-1:2012-03) and based on bisphenol A and terminated by phenol. The material contains 0.1% by weight of Macrolex Green SB (1,4-bis(tolylamino)anthraquinone; anthraquinone dye; Solvent Green 3; Color index 61565) from Lanxess AG and 0.1% by weight of Macrolex Violet 3R (anthraquinone dye; Solvent Violet 36; Color index number 61102) from Lanxess AG. The polycarbonate has a light transmittance in the VIS range of the spectrum (380 to 780 nm) of about 0%.

Substrate 2: Polycarbonate from Covestro Deutschland AG having an MVR of about 12 cm$^3$/(10 min), measured at 300° C. and load 1.2 kg (to ISO 1133-1:2012-03); based on bisphenol A and terminated by phenol. The material contains 0.16% by weight of carbon black and has a light transmittance in the VIS region of the spectrum (380 to 780 nm) of 0%.

Substrate 3: Transparent polycarbonate sheet composed of having an MVR of about 12 cm$^3$/(10 min), measured at 300° C. and load 1.2 kg (to ISO 1133-1:2012-03), from Covestro Deutschland AG.

The sheets were produced by the injection molding process and had a thickness of 4 mm.

Substrate 4: Extruded PMMA sheet from Evonik GmbH, Plexiglas XT, color: black 9N870GT, sheet thickness: 3 mm.

Substrate 5: Cast PMMA sheet from Evonik GmbH, Plexiglas GS, color black 9C20GT, sheet thickness: 3 mm, IR-transparent.

Light transmittance in the VIS region of the spectrum (380 to 780 nm, transmittance Tvws) was determined to DIN ISO 13468-2:2006 (D65, 10°, layer thickness of specimen sheet: 4 mm).

The direct solar transmittance $T_{DS}$ of the substrate material at a layer thickness of 4 mm was determined to ISO 13837:2008. The transmission measurements were performed using a Perkin Elmer Lambda 950 spectrophotometer with a photometer sphere. All values were determined in the course of measurement with wavelengths of 320 nm to 2500 nm inclusive where Δλ is 5 nm.

Average IR transmittance is understood to mean the arithmetic average of the transmittance in the wavelength range from 780 to 2500 nm which is determined at a layer thickness of 4 mm to ISO 13468-2:2006.

TABLE 1

Transmittance data for the substrate materials

| | Thickness | $T_{VIS}$ (%) | $T_{DS}$ (%) | Average IR transmittance (%) |
|---|---|---|---|---|
| Substrate 1 | 4 mm | 0 | 37.4 | 56 |
| Substrate 2 | 4 mm | 0 | <1 | <1 |
| Substrate 3 | 4 mm | 88 | 59 | 56 |
| Substrate 4 | 3 mm | 0 | 0 | 0 |
| Substrate 5 | 3 mm | 0 | 31.9 | 52.5 |

Metal Layer M1:

By means of a sputtering process, an about 200 nm-thick layer of aluminum was deposited on the appropriate substrate.

The coating system consisted of a vacuum chamber in which the samples were positioned on a rotating sample holder. The sample holder rotated at about 20 rpm. Before they were introduced into the vacuum chamber, the test specimens were blown with ionized air in order to free them of dust. Thereafter, the vacuum chamber containing the test specimen was evacuated to a pressure p≤1·10$^{-5}$ mbar. The samples were metallized under this reduced pressure. For this purpose, argon gas was admitted at a pressure of 5·10$^{-3}$ mbar. By means of DC magnetron, an aluminum layer of thickness about 200 nm was applied.

Metal Layer M2:

M2 was a metal-containing foil comprising a PET carrier film having a thickness of 50 μm and an alternating layer sequence of silver layers and indium oxide layers, where the total thickness of the alternating layer sequence was 150 nm. The total thickness of the silver layers was 18 nm. The metal-containing foil was laminated to the underside of substrate layer b by means of an acrylate adhesive. Thus, the metal layer was enclosed by the polycarbonate substrate and the PET carrier film.

Metal Layer M3:

M3 was a metal-containing foil comprising a PET carrier film having a thickness of 50 μm and an alternating layer sequence of silver layers and indium oxide layers, where the total thickness of the alternating layer sequence was 150 nm. The total thickness of the silver layers was 18 nm. The PET carrier film was laminated to the underside of substrate layer b by means of an acrylate adhesive. Thus, the PET carrier film was enclosed by the polycarbonate substrate and the silver layer, and the metal layer formed the lowermost layer.

Protective Layer 1 (Protective Layer e):

By means of plasma polymerization, in example 8 and in example 9, an anticorrosion layer of hexamethyldisiloxane (HMDSO) was applied to the metal layer. For this purpose, HMDSO was evaporated and the vapor was admitted into the vacuum chamber until there was a pressure of about 0.07 mbar. Thereafter, a plasma was ignited with a diode arrangement at 1000 W and the anticorrosion layer was applied for one minute. The diode arrangement consisted of two parallel metal electrodes that were operated at an alternating frequency of 40 kHz.

Protective Layer 2 (Protective Layer a):

The coating was conducted manually. The liquid primer or lacquer solution for forming the protective layer was poured here across the sheet in longitudinal direction starting from the upper edge of the small part while simultaneously guiding the starting point of the lacquer on the sheet from left to right across the width of the sheet. After a flash-off time of 30 minutes at 23° C. and the painted sheets were then cured at 130° C. for 60 minutes while suspended vertically from a clip. After the applying of the primer layer, the topcoat or hard coat was applied in an analogous manner and, after a flash-off time of 30 minutes at 23° C., cured at 130° C. for 60 minutes.

Figure 2:
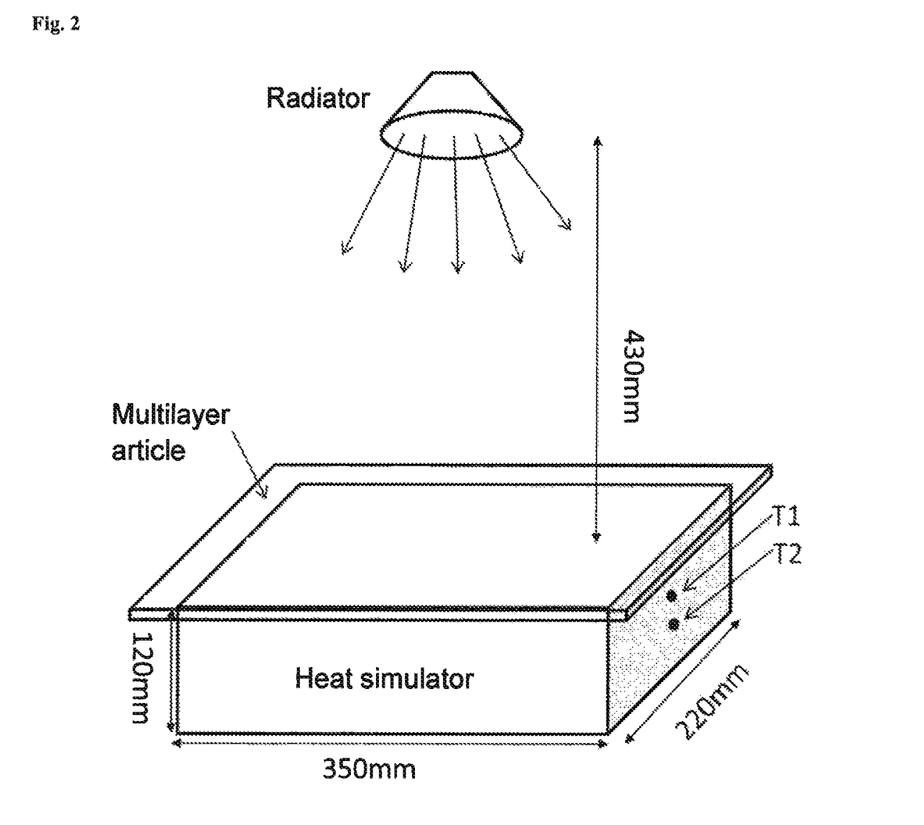
FIG. 2 is a schematic of a setup for testing a multilayer article of the invention using a heat simulator.

Test Setup:

The multilayer article was tested in a heat simulator (for test setup see FIG. 2). The heat simulator consisted of a metallic container with dimensions W×H×D of 220 mm×350 mm×120 mm. The walls were about 2 mm thick. The walls were covered with about 20 mm of black insulation on the inside. The base likewise consisted of a black insulation layer of thickness about 20 mm. Two thermocouples had been inserted into the interior. One thermocouple was about 70 mm below the upper edge of the container and was thus able to directly absorb the radiation coming through the multilayer article or from the multilayer article (T1). A second thermocouple beneath was covered with a metal plate and measured the temperature of the interior without being exposed directly to the radiation through the multilayer article (T2).

The respective multilayer article was placed onto the metal container and screwed down at the edges in order to prevent direct contact with the outside environment and hence convection effects from the environment. The surface temperature on the top side of the multilayer article was likewise measured (T3). Also measured was the ambient temperature (T4).

Above the multilayer article was disposed a quartz halogen lamp centered above the heat simulator with a power of 400 W at a distance of 430 mm from the surface of the multilayer article. In order to test the constancy of the irradiation, the irradiation intensity in the wavelength range of 400 to 800 nm was measured at the start and at the end of the testing (sensor: Gigahertz RW-3703-4). The irradiation intensity was between 10 and 12 mW/cm$^2$.

Test Method:

The temperatures at the measurement sites T1, T2, T3 were measured continuously. After a testing period of about 2 h, no further changes were detectable in the temperature progressions. The measurement recorded was the temperatures after 4 h. The surface temperature of the multilayer article was measured in each case at the end of the testing period by means of an IR thermometer.

Example 1—Comparative Example

The heat simulator box was covered with a 4 mm-thick injection-molded polycarbonate sheet of substrate 1. The temperature rise in the interior (T1 and T2) and the surface temperature were recorded.

Example 2—Comparative Example

The heat simulator box was covered with a 4 mm-thick injection-molded polycarbonate sheet of substrate 2. The temperature rise in the interior (T1 and T2) and the surface temperature were recorded.

Example 3—Comparative Example

The heat simulator box was covered with a multilayer article composed of a 4 mm-thick layer of substrate 1 and a metal layer M1 applied to the underside thereof, and a protective layer, applied to the metal layer, of PHC 587C (Momentive Performance Materials Inc.) in the form of a lacquer layer as protective layer e having a thickness of 2 to 3 µm. The lacquer layer was applied manually by the flow-coating method. The coating was flashed off at 23° C. and 33% rel, humidity for 30 minutes and then baked at 125° C. for 30 minutes. Metal layer M and lacquer were on the side of the substrate layer remote from the radiation source.

Example 4—Comparative Example

The heat simulator box was covered with a multilayer article having a layer sequence composed of substrate 1 in a thickness of 4 mm, a metal layer M1 applied on the underside of the substrate layer, and a polycarbonate layer of substrate 3 applied atop the metal layer, likewise with thickness 4 mm. The layer of substrate 1 was directed toward the radiation source.

Example 5—Comparative Example

The heat simulator box was covered with a multilayer article having a layer sequence composed of substrate 1 in a thickness of 4 mm, a metal layer M1 arranged on the underside of the substrate layer, a protective layer beneath of HMDSO having a thickness of 30 nm, and a polycarbonate layer of substrate 3, likewise in thickness 4 mm. The layer of substrate 1 was directed toward the radiation source.

Example 6-Comparative Example

The heat simulator box was covered with a multilayer article composed of substrate 1 in a thickness of 4 mm and a metal-containing foil M2 applied beneath the substrate layer, where the metal part of the foil was oriented toward substrate 1 and the PET part was directed away from substrate 1.

Example 7—Comparative Example

The heat simulator box was covered with a multilayer article having the layer sequence of substrate 1 in a thickness of 4 mm and metal-containing foil M3 disposed on the underside of the substrate layer. The PET carrier film of M3 was oriented toward substrate 1, while the metal layer faced the inside of the box.

Example 8-Inventive

The heat simulator box was covered with a multilayer article composed of a 4 mm-thick layer of injection-molded substrate 2, a metal layer M1 applied to the underside of the substrate layer, and a protective layer of hexamethyldisiloxane (protective layer 1) arranged on the metal layer toward the three-dimensional volume to be shielded and having a thickness of 30 nm. Metal layer M1 and protective layer 1 were on the side of the substrate layer remote from the radiation source.

Example 9—Inventive

The heat simulator box was covered with a multilayer article having a layer sequence composed of substrate 1 in a thickness of 4 mm, a metal layer M arranged on the underside of the substrate layer, and a protective layer 1 arranged in turn atop the metal layer and having a thickness of 30 nm. The metal layer was on the side of substrate 1, which was directed away from the radiation source.

Example 10-Inventive

The heat simulator box was covered with a multilayer article having a layer sequence composed of substrate 1 in a thickness of 4 mm, a metal layer M1 arranged on the underside of the substrate layer, and a protective layer 1 arranged in turn atop the metal layer and having a thickness of 30 nm. The metal layer was on the side of substrate 1, which was directed away from the radiation source. Substrate layer 1 was provided with a protective layer 2 (protective layer a) on the uncoated top side.

Example 11—Comparative Example

The heat simulator box was covered with a multilayer article having a layer sequence of substrate 5 in a thickness of 3 mm.

Example 12—Comparative Example

The heat simulator box was covered with a multilayer article having a layer sequence of substrate 4 in a thickness of 3 mm.

Example 13—Inventive

The heat simulator box was covered with a multilayer article having a layer sequence composed of substrate 5 in a thickness of 3 mm, a metal layer M1 applied to the underside of the substrate layer, and a protective layer of hexamethyldisiloxane (protective layer 1) arranged on the metal layer toward the three-dimensional volume to be shielded and having a thickness of 30 nm. Metal layer M1 and protective layer 1 were on the side of the substrate layer remote from the radiation source.

Example 14—Inventive

The heat simulator box was covered with a multilayer article having a layer sequence composed of substrate 4 in a thickness of 3 mm, a metal layer M1 applied to the underside of the substrate layer, and a protective layer of hexamethyldisiloxane (protective layer 1) arranged on the metal layer toward the three-dimensional volume to be shielded and having a thickness of 30 nm. Metal layer M1 and protective layer 1 were on the side of the substrate layer remote from the radiation source.

TABLE 2

Results

| | T1 Inside sun | T2 Inside shade | T3 Surface | T4 Environment |
|---|---|---|---|---|
| 1 (comparative) | 68° C. | 54° C. | 60° C. | 22° C. |
| 2 (comparative) | 50° C. | 43° C. | 76° C. | 23° C. |
| 3 (comparative) | 40° C. | 37° C. | 56° C. | 23° C. |
| 4 (comparative) | 40° C. | 36° C. | 54° C. | 22° C. |
| 5 (comparative) | 41° C. | 37° C. | 56° C. | 22° C. |
| 6 (comparative) | 49° C. | 42° C. | 59° C. | 23° C. |
| 7 (comparative) | 45° C. | 39° C. | 60° C. | 23° C. |
| 8 (inventive) | 37° C. | 35° C. | 79° C. | 23° C. |
| 9 (inventive) | 34° C. | 32° C. | 60° C. | 23° C. |
| 10 (inventive) | 32° C. | 30° C. | 55° C. | 20° C. |
| 11 (comparative example) | 66.0° C. | 52.2° C. | 59.0° C. | 20.5° C. |
| 12 (comparative example) | 49.8° C. | 43.8° C. | 71.0° C. | 21.2° C. |
| 13 (inventive) | 30.4° C. | 28.7° C. | 52.7° C. | 20.1° C. |
| 14 (inventive) | 31.3° C. | 29.5° C. | 560° C. | 20.7° C. |

The layer construction of the invention for bodywork parts composed of specific polycarbonate and specific metal layer in a particular arrangement surprisingly shows lower interior temperatures than the multilayer articles used for comparison—both directly beneath the multilayer article and in the "shade", lower temperatures are measured in the case of the multilayer article of the invention.

Comparative examples 3, 4, 5, 6 and 7 show that introduction of metal layers can effectively reduce the interior temperatures; in other words, it was possible to achieve lower interior temperatures by comparison with examples 1 and 2 that did not contain any metal layers. Surprisingly, however, the arrangement of the metal layer and the type of metal layer is also important. By particular arrangement of the metal layer, in inventive examples 8 and 9, even lower temperatures were achievable by comparison with examples 3 to 7. Example 7 with a metal layer thickness of just 18 nm shows that not every metal layer is capable of distinctly reducing the interior temperatures. Thus, inventive examples 8 and 9 with inventive metal layer and arrangement have lower interior temperatures. Surprisingly, the transmission properties of the substrates also play a role. In the particularly preferred cases that are described in examples 9 and 10, the lowest interior temperatures are measured. At the same time, the layer structure does not have any troublesome metallic impression toward the "outside". Compared to an IR-transparent construction (example 9), a non-IR-transparent construction (example 8) is slightly disadvantageous since the surface of the multilayer article heats up significantly. This is a further advantage of the particularly preferred case. It was also shown that further protective layers present atop the substrate (protective layer a; example 10) do not have an adverse effect on the heat budget of the interior. This was surprising since lacquer layers of this kind often associating with antireflective properties and hence should increase the energy input. Inventive examples 13 and 14 show that PMMA is also suitable as substrate material.

The invention claimed is:

1. A bodywork part comprising a multilayer article having at least one side, comprising, in this sequence,
   a) optionally a protective layer a,
   b) a substrate layer b based on an aromatic polycarbonate or a
      polymethylmethacrylate, having a thickness of from 1.0 to 7.0 mm and having light transmittance in the range from 380 to 780 nm of less than 1.0% determined at a layer thickness of 4 mm according to DIN ISO 13468-2:2006 (D65, 10°) and solar energy transmittance TDS of less than 40%, determined in accordance with ISO 13837:2008 at a layer thickness of 4 mm, and wherein substrate layer b is IR-transparent;
   c) optionally a further layer c based on a thermoplastic polymer having a maximum thickness of 600 µm,
   d) a metal layer d comprising at least one element selected from Ag, Al, Au, Pt, Fe, Cr, Sn, In, Ti, Pd, Nb, Cu, V, stainless steel or alloys thereof, having a thickness of 40 nm to 500 µm, and
   e) optionally a protective layer e,
   wherein
   the metal layer d is disposed on the side of the multilayer article destined to be oriented toward an interior of a vehicle, and wherein
   any layer(s) that follow(s) on from layer d, including protective layer e, has/have a total thickness of not more than 50 nm.

2. The bodywork part as claimed in claim 1, wherein the bodywork part has a three-dimensionally shaped surface.

3. The bodywork part as claimed in claim 1, wherein the protective layer a) comprises a polysiloxane lacquer comprising
   organosilicon compounds having the formula $R_nSiX_{4-n}$ and/or partial condensates thereof, where the radicals
   R are the same or different and are a linear or branched, saturated or mono- or polyunsaturated or aromatic hydrocarbyl radical,
   the radicals
   X are the same or different and are hydrolyzable groups or hydroxyl groups and n is 0, 1, 2 or 3,
   and at least one UV absorber.

4. The bodywork part as claimed in claim 1, wherein the protective layer e is an anticorrosion layer of hexamethyldisiloxane.

5. The bodywork part as claimed in claim 1, wherein the substrate layer b contains less than 0.001% by weight of carbon black and no IR absorbers other than carbon black, based on the total weight of substrate layer b.

6. The bodywork part as claimed in claim 1, wherein the substrate layer b does not contain any carbon black.

7. The bodywork part as claimed in claim 5, wherein the substrate layer b comprises at least two colorants from the groups consisting of anthraquinone dyes and perinone dyes.

8. The bodywork part as claimed in claim 7, wherein the sum total of all colorants is more than 0.05% by weight, based on the total weight of substrate layer b.

9. The bodywork part as claimed in claim 1, wherein the average IR transmittance of the substrate layer b at the thickness that exists in the multilayer article in the range between 780 and 2500 nm is at least 50%, where the "average IR transmittance" is understood to mean the arithmetic average of the transmittance measured according to ISO 13468-2006.

10. The bodywork part as claimed in claim 1, wherein the multilayer article comprising layers a, b, optionally c, d and optionally e and any adhesive layers present for bonding of the individual layers and/or metal oxide or metal nitride layers, does not comprise any further layers.

11. The bodywork part as claimed in claim 1, wherein the bodywork part consists of the multilayer article.

12. The bodywork part as claimed in claim 1, wherein the bodywork part is a roof, roof module, part of a roof module, sunvisor, lining or frame, in each case for a vehicle or part thereof.

\* \* \* \* \*